Feb. 6, 1923.

F. E. LAYMAN 1,444,617

MOLDING MACHINE

Filed June 26, 1920

Inventor

Frank E. Layman.

By Frank W Hubbard

Attorney

Feb. 6, 1923.

F. E. LAYMAN

MOLDING MACHINE

Filed June 26, 1920

Inventor
Frank E. Layman.
By
Attorney

Patented Feb. 6, 1923.

1,444,617

UNITED STATES PATENT OFFICE.

FRANK E. LAYMAN, OF MILWAUKEE, WISCONSIN, ASSIGNOR TO THE CUTLER-HAMMER MFG. CO., OF MILWAUKEE, WISCONSIN, A CORPORATION OF WISCONSIN.

MOLDING MACHINE.

Application filed June 26, 1920. Serial No. 391,907.

*To all whom it may concern:*

Be it known that I, FRANK E. LAYMAN, a citizen of the United States, residing at Milwaukee, in the county of Milwaukee and State of Wisconsin, have invented new and useful Improvements in Molding Machines, of which the following is a full, clear, concise, and exact description, reference being had to the accompanying drawing, forming a part of this specification.

This invention relates to molding machines and more particularly to machines for molding articles from plastic material.

My prior Patent 1,150,437, August 17, 1915, discloses a machine for molding an attachment plug insulating part having a screw threaded extremity. This machine includes a pair of lateral forming dies to be projected into the molding space to form screw threads on the extremity of the article during molding thereof and retractable therefrom to permit ejection of the article from the mold. These forming dies are hand operated and the output of the molding machine is therefore largely dependent upon the dexterity of the operator in manipulating said die parts without delaying successive operations of the press.

This invention has among its objects to provide an improved molding machine wherein the lateral forming dies are automatically projected into the molding space during forming of the article and retracted therefrom for ejection of the article.

Various other objects and advantages will hereinafter appear.

The accompanying drawing illustrates an embodiment of the invention which will now be described, it being understood that the embodiment illustrated is susceptible of various modifications, without departing from the scope of the appended claims.

Figure 1:
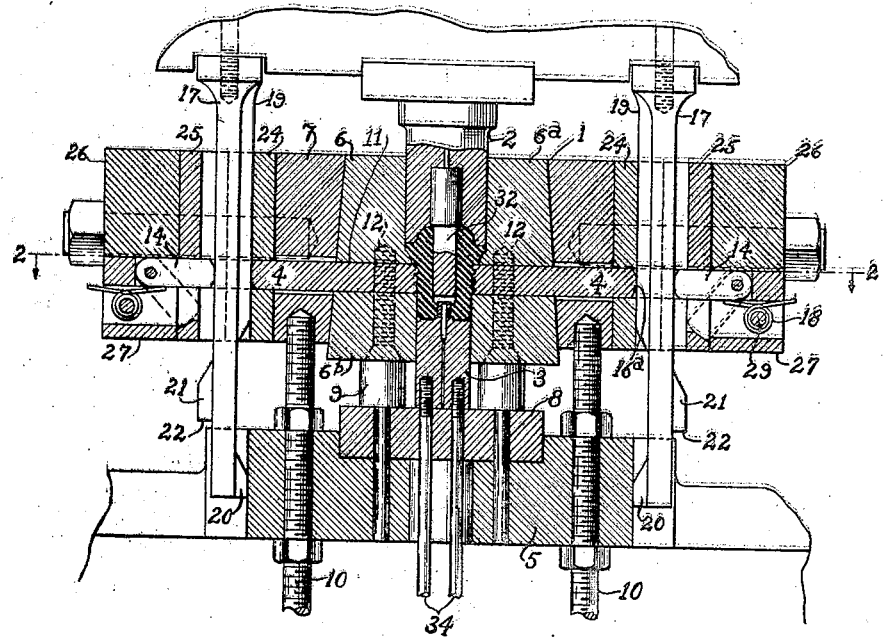
Fig. 1 is a vertical sectional view of a molding machine embodying the invention.

The molding machine illustrated includes a mold 1 to be mounted on the bed of the press and having an opening therein to receive the material, an upper die 2 movable by the crosshead of the press into said opening to mold the material therein, a lower die 3 movable upwardly by the ejecting mechanism of the press to eject the article from the mold and a pair of lateral forming dies 4 to be projected into said opening during forming of the article and retractable therefrom to permit ejection of the article.

The mold 1 comprises a bed plate 5 having a mold box 6 secured thereto by a yoke member 7. The bed plate 5 is arranged for mounting on the bed of the press in the usual manner and is centrally recessed to receive a circular plate 8 having stop pins 9 mounted thereon to abut the lower face of mold box 6. Mold box 6 is cone shaped and fits within a centrally bored portion in yoke member 7 and the latter is secured to bed plate 5 by the bolts 10 to clamp said mold box against stop pins 9. Mold box 6 is centrally bored to provide a molding space of the desired contour and comprises an upper member 6ª having a diametrical recess 11 in its lower face to receive dies 4 and a lower member 6ᵇ secured to the former by screws 12.

Figure 5:
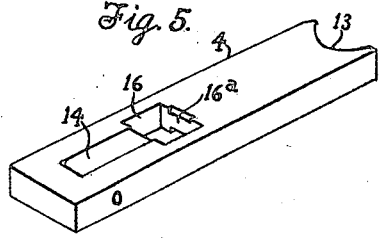
Fig. 5 is a perspective view of one of the lateral forming dies.

Dies 4 are arranged on opposite sides of the bore in mold box 6 and each is provided with a die face 13 to be projected into the bore of said mold box to reduce a given cross section of the article during molding thereof and to be retracted therefrom to permit ejection of the article. Dies 4 extend outwardly through openings in yoke member 7 and as best shown in Figs. 1 and 5, each has a pivoted pawl 14 mounted thereon and is provided with an opening 16 located at the free end of said pawl to receive a cam member 17. The pawls 14 are normally held in alignment with their respective dies by a spring 18 and are movable downwardly against the action of said spring to a position indicated by dotted lines in Fig. 1. The cam members 17 are arranged for mounting on the crosshead of the press and each is provided with spaced cam projections 19 and 20 on the side adjacent the mold box and with a cam projection 21 on the opposite side thereof arranged intermediate the aforesaid projections. Cam projections 19 and 20 have their adjacent ends tapered while cam projection 21 has its upper end tapered and its lower end provided with an abrupt shoulder 22.

Assuming the crosshead of the press to be in its lower position the cam members 17 are then positioned as shown in Fig. 1. In this position dies 4 are projected into the bore in mold box 6 and are locked against outward movement by engagement of cam projections 19 with inner walls 16$^a$ of openings 16 in said dies. With dies 4 projected, the inner ends of pawls 14 are located in the path of cam projections 21 and assuming upward movement of the crosshead, cam projections 19 are moved out of engagement with the walls 16$^a$ and immediately thereafter the tapered ends of cam projections 21 are moved into engagement with the free ends of pawls 14 to move the die members 4 outwardly and retract the same from the bore in mold box 6. Upon retraction of dies 4, walls 16$^a$ are moved into the path of cam projections 20 and upon continued upward movement of the crosshead, the tapered surface of cam projections 20 engage the walls 16$^a$ to move the dies inwardly to project the same into the bore in mold box 6. During downward movement of the crosshead, the abrupt shoulders 22 on cam projections 21 engage the upper faces of their respective pawls 14 and move said pawls downwardly out of the path of said cam projections. The cam members 17 are therefore ineffective to move the die members 4 outwardly during downward movement of the crosshead and during final downward movement of the crosshead cam projections 19 are moved into engagement with surfaces 16$^a$ to insure full projection of dies 4. Thus, it is apparent that during downward movement of the crosshead, dies 4 will be projected into the molding space to reduce a given cross-sectional area of the article being formed and during return of the crosshead such die parts are moved outwardly to permit ejection of the article from the mold.

Figure 2:
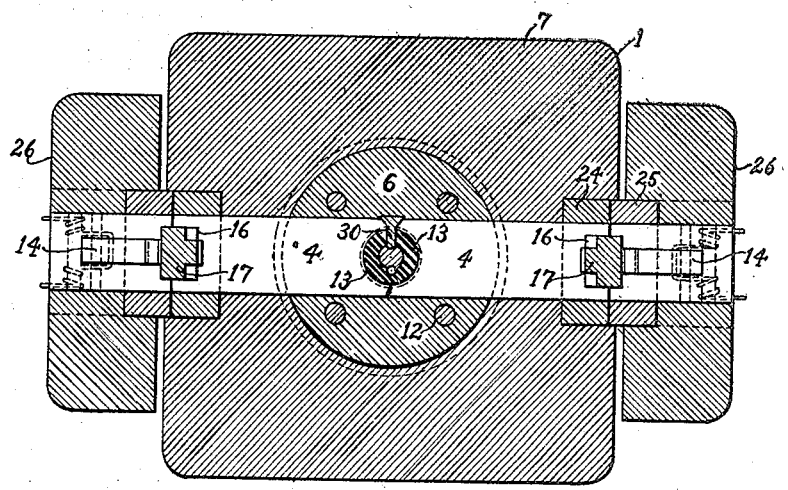
Fig. 2 is a horizontal sectional view taken substantially on line 2—2 of Fig. 1.
Figure 3:
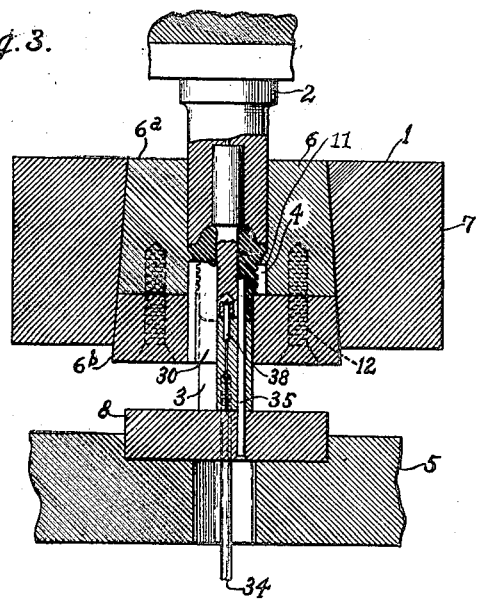
Fig. 3 is a vertical sectional view taken at substantially right angles to the view shown in Fig. 1.
Figure 4:
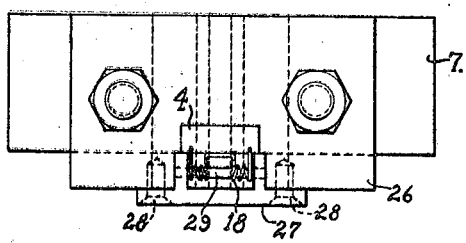
Fig. 4 is a side elevational view of certain of the parts shown in Figs. 1 and 2.

The cam members 17 are each slidably mounted between inner and outer guide members 24 and 25 secured to yoke member 7 by a bracket 26. Said guide members are each provided with openings to receive the die member 4 associated with its respective cam member 17 and guide members 25 are each cut away below the pawl members 14 to permit downward movement of the latter. The brackets 26 have their under side recessed as shown in Fig. 4 to receive dies 4 and each has a member 27 secured to the under side thereof by screws 28. The members 27 are each provided with a pin 29 to support the spring 18 of the adjacent pawl and as best shown in Fig. 2 each of the springs 18 is coiled about pin 29 on opposite sides of its respective pawl and is provided with a U-shaped portion to engage its respective pawl and with extremities to engage the under side of its respective die 4.

Figure 6:
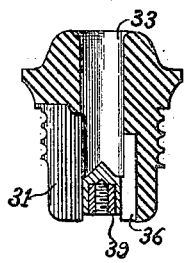
Fig. 6 is a vertical sectional view of the molded article.

The aforedescribed mold is designed for molding attachment plug members such as shown in Fig. 6. For this purpose the bore in mold box 6 is shaped to suit the side walls of the article shown in this Fig. 6 and is also provided with a projecting rib 30 in the bore thereof to form a slot 31 in the molded article. The die faces 13 are corrugated to provide the screw threaded portion on the exterior of the article and as shown in Fig. 2, the die faces 13 are cut away to accommodate the projecting rib 30 between the same.

The upper die 2 is arranged for mounting on the crosshead of the press in the usual manner and has its lower face shaped to suit the top surface of the article shown in Fig. 6. The same is also provided with a centrally located projecting pin 32 to form the central passage 33 in said article. The lower die 3 normally rests on the upper face of plate 8 and is connected to the ejecting mechanism of the press by a plurality of rods 34. As is well understood, the ejecting mechanism of the press is adapted to move the die 3 upwardly within the mold during the return stroke of the crosshead and is adapted to return die 3 prior to downward movement of the crosshead. The lower die 3 has its upper face shaped to suit the under side of the molded article shown in Fig. 6 and the same is longitudinally bored to receive a pin 35 for forming an opening 36 in said article. Said die is also provided with a centrally located projecting pin 38 said pin serving to center a threaded bushing 39 in the article during molding thereof.

It is apparent that many changes may be made in the proportions and arrangement of the parts of the aforedescribed molding machine to adapt the same to mold articles of various sorts without departing from the scope of the appended claims.

What I claim as new and desire to secure by Letters Patent is:

1. In a machine for molding articles from plastic material, in combination, a mold having an opening therein to receive the material, a plurality of reciprocatory die parts cooperating therewith, certain of said parts to be projected into and retracted from said opening at an angle to the axis thereof and another being movable within said opening to mold the article and out of said opening to permit ejection of the article, and cam operating means for automatically projecting and retracting the former of said die parts in a given time relation with respect to certain movements of the latter.

2. In a machine for molding articles from plastic material, in combination, a mold having an opening therein to receive the material, a reciprocatory die movable into said mold to form the article and movable out of the same to permit ejection of the article, lateral forming dies to be projected into and retracted from said opening at an angle to the axis thereof and means movable by said reciprocatory die for automatically projecting said latter dies into said opening during forming of the articles and for retracting the same therefrom to permit ejection of the article.

3. In a machine for molding articles from plastic material, in combination, a mold having an opening therein to receive the material, a plurality of reciprocatory die parts co-operating therewith certain of said parts to be projected into and retracted from said opening at an angle to the axis thereof, and another of said parts being movable into said opening to mold the article and out of said opening to permit ejection of the article and means including an element movable by the latter of said die parts for projecting and retracting the former of said die parts.

4. In combination, a hollow mold having openings through the walls thereof, a reciprocatory plunger movable into and out of said mold, dies adapted to be projected through the openings in said mold and a cam operating member for each of said dies movable by said plunger through a given range, each of said cam members having cam projections for projecting its respective die part during movement thereof into either extreme position and having another cam surface for retracting its respective die part during movement thereof through an intermediate part of its range, said latter cam surface being effective only when its cam member moves in a given direction.

5. In combination, a hollow mold having openings through the walls thereof, a reciprocatory plunger movable into and out of said mold, dies adapted to be projected through the openings in said mold and means associated with said plunger for automatically projecting and retracting said dies upon reciprocation of said plunger.

6. In combination, a hollow mold having openings through the walls thereof, a reciprocatory plunger movable into and out of said mold, dies adapted to be projected through the openings in said mold, and means for automatically projecting and retracting said dies upon reciprocation of said plunger, said means including a cam operating member for each of said dies movable with said plunger.

7. In combination, a hollow mold having openings through the walls thereof, a reciprocatory plunger movable into and out of said mold, dies adapted to be projected through the openings in said mold, a pawl mounted on each of said dies and a cam member for each of said dies movable by said plunger, each of said cam members being adapted during movement of said plunger out of said mold to first engage the pawl on its respective die to retract the latter and to thereafter engage said dies to project the same, said pawls being movable out of the path of said cam members during movement of said plunger into said mold.

In witness whereof, I have hereunto subscribed my name.

FRANK E. LAYMAN.